(12) United States Patent
Van Stiphout

(10) Patent No.: US 6,926,414 B2
(45) Date of Patent: Aug. 9, 2005

(54) HINGE ACTUATOR FOR WING MIRROR OF MOTOR VEHICLE

(75) Inventor: Paulus Gerardus Maria Van Stiphout, Woerden (NL)

(73) Assignee: Eaton Corporation, Cleveland, OH (US)

(*) Notice: Subject to any disclaimer, the term of this patent is extended or adjusted under 35 U.S.C. 154(b) by 11 days.

(21) Appl. No.: 10/451,528

(22) PCT Filed: Dec. 17, 2001

(86) PCT No.: PCT/NL01/00915
§ 371 (c)(1),
(2), (4) Date: Dec. 8, 2003

(87) PCT Pub. No.: WO02/072388
PCT Pub. Date: Sep. 19, 2002

(65) Prior Publication Data
US 2004/0218296 A1 Nov. 4, 2004

(30) Foreign Application Priority Data
Dec. 19, 2000 (NL) ............................................. 1016915

(51) Int. Cl.$^7$ .............................. G02B 5/08; G02B 7/18
(52) U.S. Cl. ...................... 359/841; 359/877; 248/900
(58) Field of Search ................................ 359/841, 872, 359/877; 248/476, 478, 479, 549, 900

(56) References Cited

U.S. PATENT DOCUMENTS

| | | | | |
|---|---|---|---|---|
| 4,728,181 A | * | 3/1988 | Kakinuma | ................... 248/549 |
| 4,789,232 A | * | 12/1988 | Urbanek | ...................... 248/549 |
| 5,005,797 A | * | 4/1991 | Maekawa et al. | ........... 248/479 |
| 6,637,715 B2 | * | 10/2003 | Hoek | ........................ 248/476 |

* cited by examiner

*Primary Examiner*—Mark A. Robinson
(74) *Attorney, Agent, or Firm*—Roger A. Johnston

(57) ABSTRACT

A hinge actuator for a wing mirror of motor vehicle, which is operative between an extreme fold-in position and an extreme fold-out position and between the extreme fold-out position and an extreme fold-over position, comprising a mirror base, provided with a frame with a frame part which extends around a base shaft and supported on a base flange. A first cam track located between the base shaft and the frame part, with at least one bearing element, is present, and a first elastic element extending on a side along this track. During a rotation of the frame relative to the base shaft between the extreme fold-in position and the extreme fold-out position, the first elastic element contact with the bearing element undergoes a deformation, while during a rotation between the extreme fold-out position and the extreme fold-over position, the first elastic element undergoes a further-going deformation.

10 Claims, 3 Drawing Sheets

HINGE ACTUATOR FOR WING MIRROR OF MOTOR VEHICLE

The present invention relates to a hinge actuator for a wing mirror of motor vehicles according to the preamble of claim 1.

It is generally known that motor vehicles, such as cars, are equipped with at least one wing mirror. The wing mirror comprises a cup-shaped mirror housing having disposed therein a mirror path which, during use, is directed substantially perpendicularly to the longitudinal direction of the car to enable the driver to view the part of the road beside and behind the car. The mirror housing projects from the side of the car over a particular distance. In certain situations, it is desired to reduce that distance, for instance when parking in a narrow space. To that end, the mirror housing can be hinged relative to the car about a hinge pin which, in most cases, is directed substantially vertically, whereby the end of the mirror housing, through a rearwardly directed hinge movement about that pin, is brought closer to the body of the car; such a movement is designated as 'folding in' and the extreme position thus achieved is designated as 'extreme fold-in position'. Designated as 'folding out' is the reverse hinge movement, from the extreme fold-in position to the normal operative position, that is, the 'extreme fold-out position'. The hinging possibility referred to also involves a safety aspect. If an obstacle outside the car hits the mirror housing, the mirror housing yields, thereby avoiding, at least reducing, damage both to the car and the mirror and to the obstacle, which may also be a person. For safety reasons, it is therefore desired that the mirror housing can make a comparable hinge movement in forward direction. Such a movement is designated as 'folding over' and the extreme position thus achieved as 'extreme fold-over position'.

To enable the various hinge movements, use can be made of a hinge actuator, provided with a mirror base including a base shaft and a base flange, intended to be secured to a car, and a frame which is movable about the base shaft and which forms part of the mirror housing.

Such a hinge actuator, although electrically operable, is known from the International patent application WO-A-97/43144. In the hinge actuator known from this document, a coupling element in the form of a gear is arranged around the base shaft, above the frame part fitted around the shaft, and above this coupling gear there is fitted a clutch ring or bus having a torque-limited claw coupling between the bottom surface of the bus and the top surface of the coupling gear. As long as the bus and the coupling gear mesh, the coupling gear is fixed in a rotational sense with respect to the mirror base, and with the aid of an electric motor a rotation of the frame relative to the mirror base can be effected. If the frame, after a rotation about the base shaft, runs against a stop defining the extreme fold-out position, the electric motor cuts out. If subsequently a sufficiently great torque is exerted on the frame by hand, the bus and the coupling gear are uncoupled, whereby the bus, against spring action, is pressed upwards. The frame can then rotate freely about the base shaft. The bus then remains fixed with respect to the mirror base in rotational sense, and the coupling gear with respect to the frame. Further, the frame is thereby shifted upwards in axial direction to come clear of the stop in the extreme fold-out position.

A disadvantage of this known hinge actuator resides in the amount of space that is occupied by this actuator; in particular, the spring present in this actuator must have a minimum length and a specifically defined characteristic and there must be room for an upward movement of the frame relative to the mirror base.

EP 0 846 596 and EP 0 402 465 disclose a hinge actuator for a door mirror having a clutch for disengaging the housing from the drive at a time of overload in which the clutch respectively comprises a nose carried on a flexible lever arm and a nose of resilient material that are press fit into a notch.

U.S. Pat. No. 4,728,181 discloses a hinge construction for a door mirror in which a resilient shock absorbing member is mounted between an inner cylinder of the hinge that is carried on the housing and an outer cylinder of the hinge that is carried on the door.

JP 02 048241 discloses a hinge actuator for a door mirror according to the preamble of claim 1, having a clutch for disengaging the housing from the drive mechanism at a time of overload. The clutch is formed by a roller that is press fit into a groove by an elastic ring. At a time of overload, the roller is pushed out against the elastic ring, so that the housing can be disengaged from the drive mechanism without vertical movement of the housing. During normal operation, the roller, the elastic ring and the groove remain stationary relative to each other.

Although the hinge actuator has a clutch mechanism of compact and simple construction that allows movement of the frame relative to the base shaft by deformation of an elastic element in contact with a bearing element of a track of cams, the clutch mechanism does not define an extreme fold-in position, and an extreme fold-over position. Further, it does not differentiate between rotational movement of the frame between the extreme fold-in position and the extreme fold-out position on the one hand, and the extreme fold-out position and the extreme fold-over position on the other hand. The object of the invention is to avoid this disadvantage while maintaining a simple construction.

To achieve this object, the hinge actuator according to the invention is characterized by the features of claim 1. In the simplest embodiment, the hinge actuator is completely manually movable, whereby the frame is movable between the extreme fold-in position and the extreme fold-out position by exerting a limited torque by hand, and whereby the frame can be moved between the extreme fold-out position and the extreme fold-over position by exerting a greater torque.

To obtain an electrically operable construction, the hinge actuator is characterized in that around the base shaft and on the frame part an annular coupling element is arranged, while a second cam track located between the base shaft and the coupling element is present, and a second elastic element extending on a side along this second cam track, as well as a motor, fixedly connected with the frame, with transmission means, to enable, in cooperation with the coupling element, solely between the extreme fold-in position and the extreme fold-out position, a rotation drive of the frame relative to the base shaft, wherein during this rotation drive the first elastic element in contact with the bearing element undergoes a deformation, and wherein during a further, manually effected rotation of the frame together with the coupling element relative to the base shaft between the extreme fold-out position and the extreme fold-over position, both the first and the second elastic element in contact with the respective bearing element undergo a further-going deformation. The frame is therefore movable between the extreme fold-in position and the extreme fold-out position through motor drive, while a manual displacement is possible between the extreme fold-out position and the extreme fold-over position. For this latter displacement, whereby a further-going deformation of the elastic element occurs, a greater torque is required than for a deformation thereof during motor drive. It is noted that the coupling element is preferably a coupling gear, so that a compact transmission between the coupling element and a motor can be realized. With a different coupling element, a transmission would have to be realized, for instance, through a mechanical linkage.

For both the manually operable design and the electrically operable design, it holds that in a first embodiment, the first cam track is arranged between the base shaft and the first elastic element and in the base shaft a groove is provided for the guidance of the bearing element, and that in a second embodiment, the first cam track is arranged between the frame and the first elastic element and in the frame a groove is provided for the guidance of the bearing element. These two embodiments are each other's complement. In the first case, the frame, the elastic element and the cam track can rotate relative to the base shaft and in the second case the frame can rotate relative to the assembly of base shaft, elastic element and cam track. As bearing elements, for instance balls, needle pivots and the like can be used.

In a particularly favorable, likewise electrically operable embodiment, around the base shaft and on the frame part an annular coupling element can be arranged in which at the underside a groove is provided for the guidance of the bearing element in the first cam track, as well as a motor, fixedly connected with the frame, with transmission means, to enable, in cooperation with the coupling element, solely between the extreme fold-in position and the extreme fold-out position, a rotation drive of the frame relative to the base shaft, wherein during this rotation drive the first elastic element in contact with the bearing element undergoes a deformation and wherein during a further, manually effected rotation of the frame together with the coupling element relative to the base shaft between the extreme fold-out position and the extreme fold-over position, the first elastic element in contact with the respective bearing element additionally undergoes a further-going deformation in a different direction. In this case, therefore, only one cam track is needed. Here, in particular, this single cam track is arranged between the frame part and the first elastic element and in the frame part a groove is provided for the guidance of the bearing element. Preferably, the two directions in which the elastic element can be deformed are perpendicular to each other. The elastic element thereby acquires the form of a step-like element.

As already said, a relatively long spring, such as in the prior art described hereinbefore, is not needed anymore. The presence of means for exerting an axially downwardly directed pressure force on the top surface of the coupling element in the form of, for instance, a cup spring or other locking means can suffice.

For reasons of manufacturing technique, it is favorable when the elastic element and, depending on the embodiment, the frame or the mirror base in which this elastic element is arranged, are manufactured in one and the same production process, such as, for instance, a two-component injection molding process.

The invention will now be further elucidated with reference to the accompanying drawings. In the drawings.

Corresponding parts in the figures are indicated by the same reference numerals.

Figure 1:
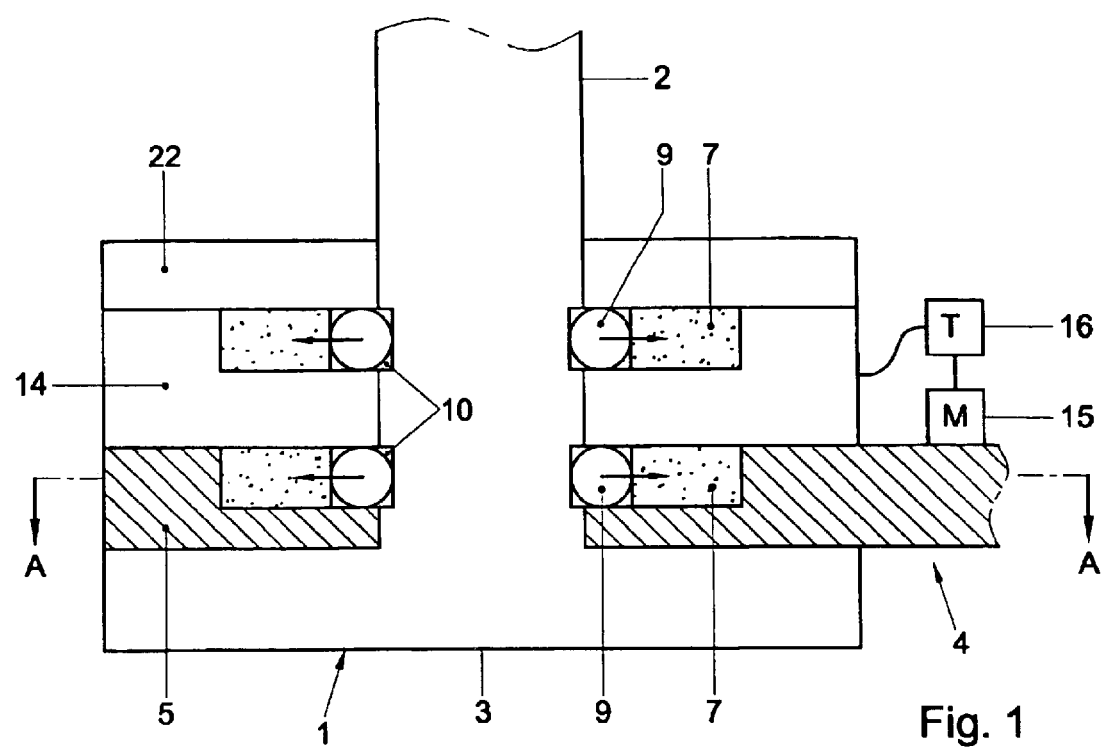
FIG. 1 shows a longitudinal section of a first embodiment of a hinge actuator according to the invention.
Figure 2:
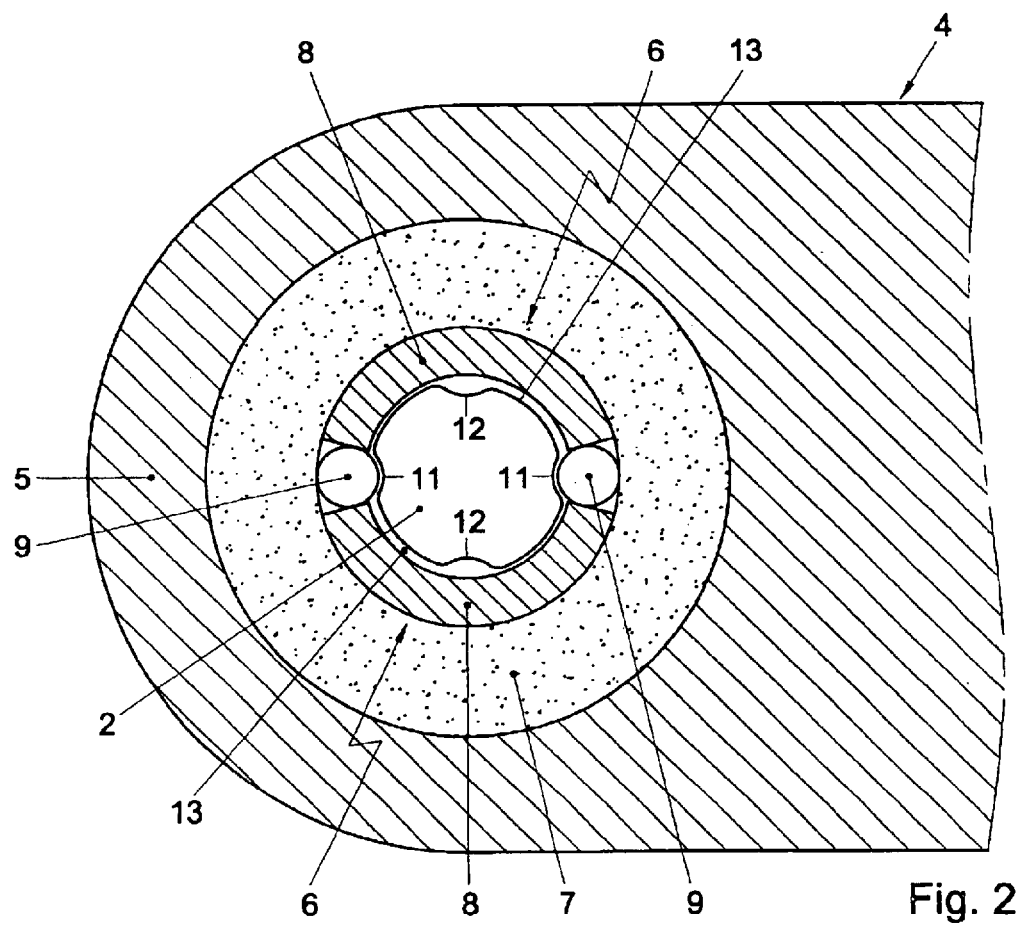
FIG. 2 shows a cross section of this first embodiment along the plane indicated in FIG. 1 by the line A—A.

The first embodiment of the hinge actuator according to the invention represented in FIGS. 1 and 2 comprises a mirror base 1 with a base shaft 2 and a base flange 3. The base flange 3 can be mounted on a car, while a frame 4 with a frame part 5 is moveable about the base shaft 2. The frame 4 forms part of a mirror housing (not shown). In a radial direction, between the base shaft 2 and the annular frame part 5, a first cam track 6 and an elastic element 7 are arranged. The cam track 6 is formed by ring segment-shaped parts 8 and balls 9. The ring segment-shaped parts 8 are integral with the annular frame part 5 and continue in the cam track virtually as far as the balls. In the present embodiment, two balls and two ring segment-shaped parts are represented. Although a single ball and a single ring segment-shaped part could suffice, in practice this number will be much greater, for instance six. The elastic element 7 is formed by a rubber ring, but can also consist of ring segment-shaped rubber parts. The assembly of frame 4, elastic element 7 and cam track 6 is therefore movable about the base shaft 2. There where this assembly is pivotable about the base shaft 2, the latter is provided with grooves 10. Such a groove 10 has a deeper portion 11 and 12, which portions receive the balls in the extreme fold-in position and the extreme fold-out position, respectively. In these two positions, the rubber ring 7 is slightly compressed. In between these two positions, the rotation of the frame 4 about the base shaft 2 requires a certain torque to enable passage through the less deep portion 13 of the groove whilst compressing the rubber ring 7 radially outwards. To enable the frame 4 to be rotated from the extreme fold-out position to the extreme fold-over position, defined by a stop not shown, a much greater torque needs to be exerted; this requires the rubber ring 7, due to the absence of a recess in the base shaft 2, to be compressed much further then. By means of a hinge actuator as described so far, the mirror housing can be operated completely by hand.

To enable electrical operation between the extreme fold-in position and the extreme fold-out position, a gear 14 is present, while on the frame 4 an electric motor 15 is arranged which, with interposition of a transmission system 16, can drive this gear. Base flange 1, frame part 5 and gear 14 are held together by means of a cup spring 22. Between the base shaft 2 and the gear 14, a second cam track 17 and an elastic element 18 are arranged. The cam track 17 is formed in the same manner as the cam track 6 by ring segment-shaped parts 19 and balls 20. The ring segment-shaped parts 19 are integral with the gear 14 and in the cam track continue virtually as far as the balls again. Here too, the number of balls and ring segment-shaped parts can be chosen as desired. Here too, the elastic element 18 is formed by a rubber ring, but can also consist of ring segment-shaped rubber parts. The assembly of gear 14, elastic element 18 and cm track 17 is therefore movable about the base shaft 2. The base shaft 2 is provided with grooves 21 in which the balls 19 rest and from which these balls can be dislodged when so great a torque is exerted that the rubber ring is compressed relatively far in radially outward direction. This requires a torque which, for instance through the presence of a torque limiter, cannot be produced by the motor 15.

In case of a motor drive from the extreme fold-in position to the extreme fold-out position, a rotation of the frame about the base shaft 2 requires a relatively small torque due to the presence of the groove 13. The motor 15 is tuned to this required torque. During this movement, the gear 14 is fixed with respect to the base shaft 2. Turning the gear would require the rubber ring 18 to be compressed relatively far. Upon reaching the extreme fold-out position, the motor 15 cannot take care of any further rotation in the direction of the extreme fold-over position, which requires a relatively great torque which the motor, through the presence of the torque limiter, cannot produce, and as a result of which the motor cuts out. The frame 4 and the gear 14 are then fixed with respect to each other. When a sufficiently high torque is exerted by hand, the frame can be turned together with the gear from the extreme fold-out position to the extreme fold-over position.

Figure 3:
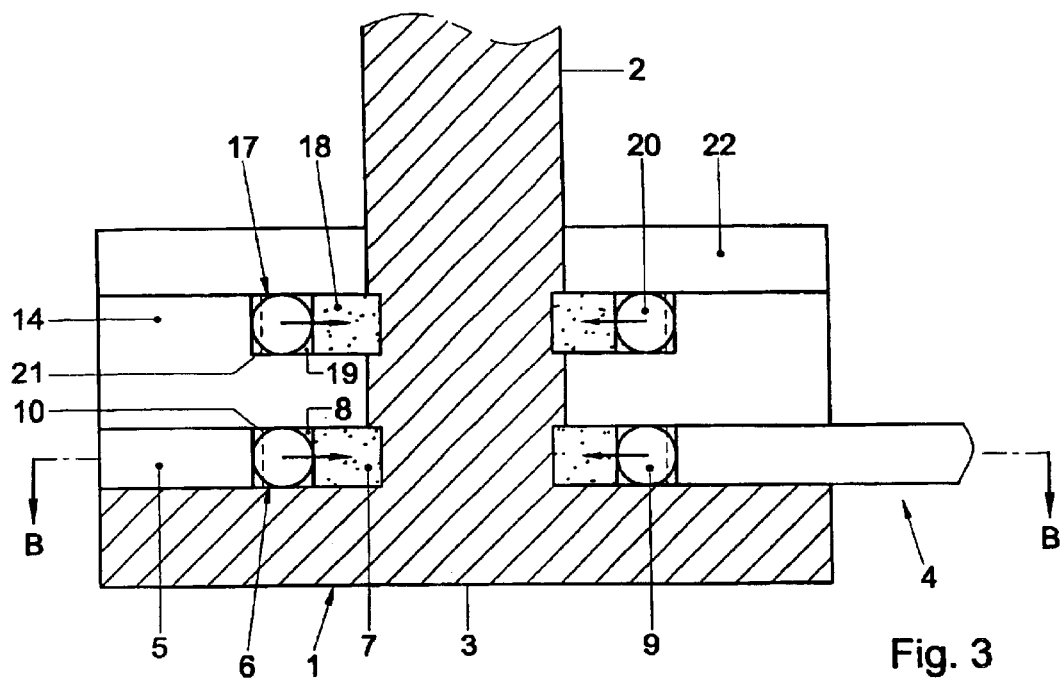
FIG. 3 shows a longitudinal section of a second embodiment of a hinge actuator according to the invention.
Figure 4:
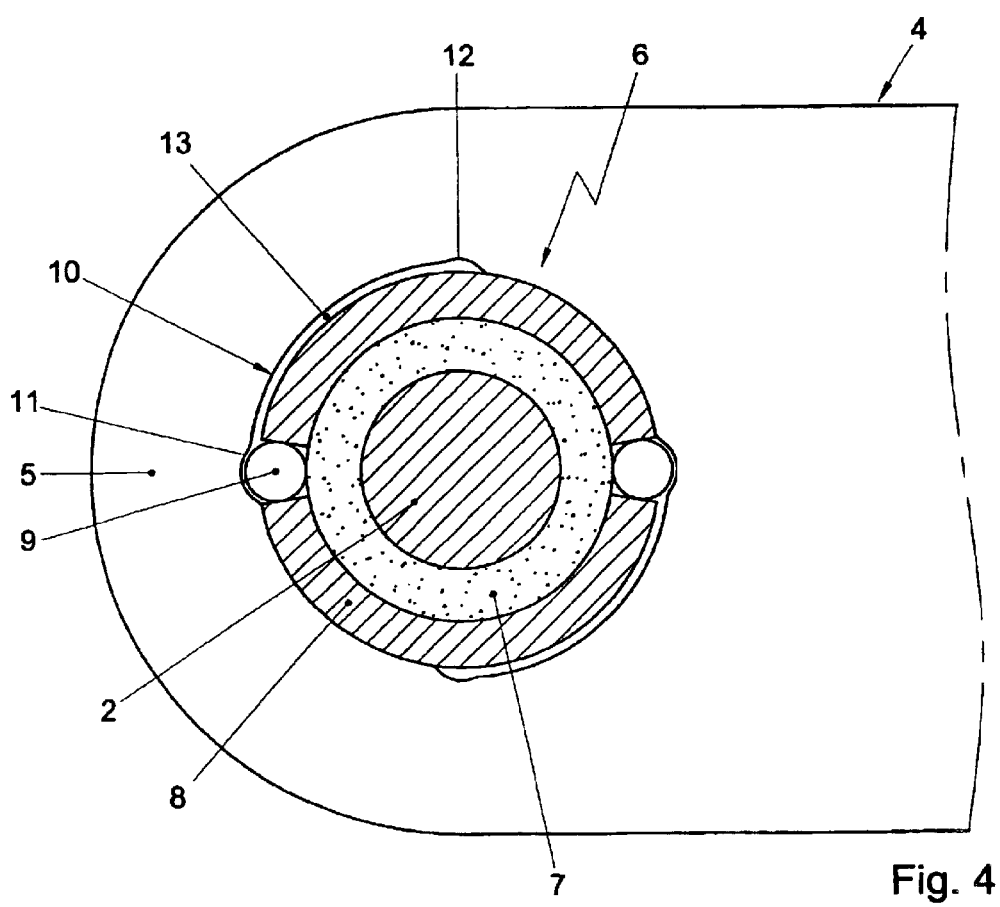
FIG. 4 shows a cross section of this second embodiment along the plane indicated in FIG. 3 by the line B—B.

FIGS. 3 and 4 show an embodiment which is complementary to that in FIGS. 1 and 2. The cam track 6 is here provided between the frame part 5 and the rubber ring 7, the latter being provided in a recess around the base shaft 2. Similarly, the cam track 17 is provided between the gear 14 and the rubber ring 18, the latter being provided in a recess around the base shaft 2 again. The groove 10, which possesses an identical shape to that in FIGS. 1 and 2, is now provided in the frame part 5, while the grooves 21, which are likewise equal to those in FIGS. 1 and 2, are provided in the gear 14. The rubber rings 7 and 18 are here pressed radially inwards if the balls are dislodged from the grooves. The ring segment-shaped parts 8 here form part of the base shaft 2. The motor 15 and the transmission system 16 have further been omitted for convenience. The operation of this second embodiment is equal to that of the embodiment of FIGS. 1 and 2. This means that through motor drive, the frame 4 can be hinged about the assembly of base shaft 2, rubber ring 7 and cam track 6 from the extreme fold-in position to the extreme fold-out position while the gear 14 remains fixed with respect to the base shaft 2 because turning the gear requires a torque greater than can be provided by the motor, due to the torque limiter, while this torque is sufficient for a rotation of the frame. When the extreme fold-out position is reached, the motor cuts out again, and a manual further rotation of the frame together with the gear to the extreme fold-over position is possible while exerting a sufficiently great torque. Frame and gear are then fixedly coupled to each other through the—inoperative—motor and the transmission system.

Figure 5:
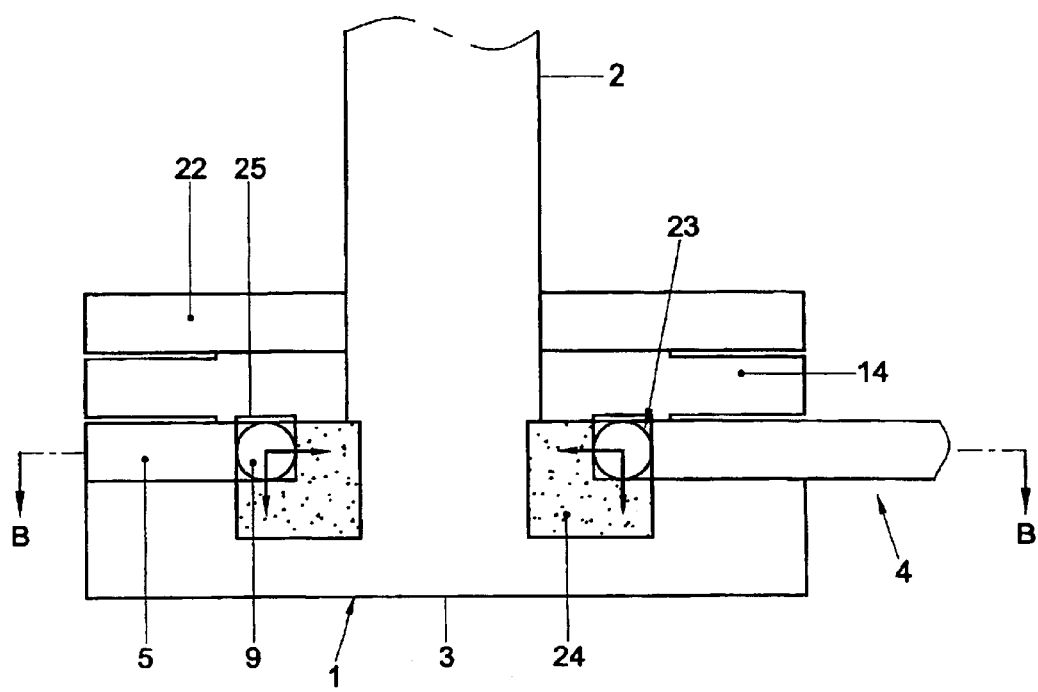
FIG. 5 shows a longitudinal section of a third embodiment of a hinge actuator according to the invention.

FIG. 5 shows a third embodiment, the cross section of this third embodiment being the same as that along the plane indicated by the line B—B in FIG. 3. The difference with the embodiment in FIGS. 3 and 4 is that only a single cam track 23 is used. The cam track is locked on the one hand between the frame 4 and the rubber ring 24 in a manner corresponding to the embodiment of FIGS. 3 and 4, and is locked on the other hand between the gear 14 and the rubber ring 24, the latter being locked in the base flange 3. Accordingly, in this embodiment, only a single, stepped-profile rubber ring 24 is needed. The gear 14 is provided at the underside with grooves 25 in which the balls 9 rest and from which the balls can be dislodged when so great a torque is exerted that the rubber ring 24 is compressed relatively far in downward direction. Similarly to the exemplary embodiments described hereinbefore, again a torque is required that is greater than the torque-limiting value of the motor. The motor and the transmission system have again been omitted here for convenience.

The operation of this third embodiment is substantially equal to that of the embodiment in FIGS. 1 and 2. This means that through motor drive the frame 4 can be moved about the assembly of base shaft 2, rubber ring 24 and cam track 23 from the extreme fold-in position to the extreme fold-out position while the gear 14 remains fixed with respect to the base shaft 2 because gear and frame are fully uncoupled from each other and turning the gear mounted relatively fixedly about the base shaft 2 requires a torque greater than the torque that can be furnished by the motor, due to the presence of a torque limiter, while this torque is sufficient for a rotation of the frame. When the extreme fold-out position is achieved, the motor cuts out again and a manual further rotation of the frame together with the gear to the extreme fold-over position is possible while exerting a torque that is greater than can be furnished by the motor. Frame and gear are here fixedly coupled to each other through the—inoperative—motor and the transmission system. The rubber ring 24 is compressed both radially inwards and in downward direction. In the latter case, the gear is coupled to the frame 4.

The operation of the embodiments described here has been elucidated with regard to a rotational movement from the extreme fold-in position to the extreme fold-out position and subsequently to the extreme fold-over position. It will be clear that the operation could also have been elucidated with regard to rotation in the reverse direction.

The invention is not limited to the embodiments described here with reference to the drawings, but encompasses a variety of modifications, naturally insofar as they fall within the scope of protection of the following claims.

What is claimed is:

1. A hinge actuator for a wing mirror of motor vehicles, which is operative between an extreme fold-in position and an extreme fold-out position and between the extreme fold-out position and an extreme fold-over position, comprising a mirror base (1), provided with a base shaft (2) and a base flange (3), and a frame (4) with a frame part (5) which extends around the base shaft (2) and is supported on the base flange (3), characterized in that a first cam track (6, 23) located between the base shaft (2) and the frame part (5), with at least one bearing element (9), is present, and a first elastic element (7, 24) extending on a side along said first cam track (6, 23), wherein during a rotation of the frame (4) relative to the base shaft (2) between the extreme fold-in position and the extreme fold-out position the first elastic element (7, 24) in contact with the bearing element (9) undergoes a deformation, and wherein during a rotation of the frame (4) relative to the base shaft (2) between the extreme fold-out position and the extreme fold-over position the first elastic element (7) in contact with the bearing element (9) undergoes a further-going deformation.

2. A hinge actuator according to claim 1, characterized in that around the base shaft (2) and on the frame part (5) an annular coupling element (14) is arranged, while a second cam track (17) located between the base shaft (2) and the coupling element (14) is present, and a second elastic element (18) extending on a side along said second cam track (17), as well as a motor (15), fixedly connected with the frame (4), with transmission means (16), to enable, in cooperation with the coupling element (14), solely between the extreme fold-in position and the extreme fold-out position, a rotation drive of the frame (4) relative to the base shaft (2), wherein during this rotation drive the first elastic element (7) in contact with the bearing element (9) undergoes a deformation, and wherein during a further, manually effected rotation of the frame (4) together with the coupling element (14) relative to the base shaft (2) between the extreme fold-out position and the extreme fold-over position, both the first (7) and the second (18) elastic element in contact with the respective bearing element (9, 20) undergo a further-going deformation.

3. A hinge actuator according to claim 2, characterized in that said first cam track (23) is arranged between the frame (4) and the elastic element (24) and in the frame a groove is provided for the guidance of the bearing element.

4. A hinge actuator according to claim 2 characterized in that means (22) for exerting an axially downwardly directed pressure force on the top surface of the coupling element (14) are present in the form of, for instance, a cup spring.

5. A hinge actuator according to claim 2, characterized in that at least one of the first and second elastic element (7, 18, 24) is designed as a soft plastic ring.

6. A hinge actuator according to claim 1, characterized in that the first cam track (6) is arranged between the base shaft (2) and the first elastic element (7), and the base shaft (2) a groove (10) is provided for the guidance of the bearing element (9).

7. A hinge actuator according to claim 1, characterized in that around the base shaft (2) and on the frame part (5) an annular coupling element (14) is arranged in which at the underside a groove (25) is provided for the guidance of the bearing element (9) in the cam track (23), a motor (15), fixedly connected with the frame (4), with transmission means (16), to enable, in cooperation with the coupling element (14), solely between the extreme fold-in position and the extreme fold-out position, a rotation drive of the frame (4) relative to the base shaft (2), wherein during this rotation drive the elastic element (24) in contact with the bearing element (9) undergoes a deformation and wherein during a further, manually-effected rotation of the frame (4) together with the coupling element (14) relative to the base shaft (2) between the extreme fold-out position and the extreme fold-over position, the first elastic element (24) in contact with the respective bearing element (9) additionally undergoes a further-going deformation in a different direction.

8. A hinge actuator according to claim 1, characterized in that at least one of the first and second elastic element (7, 18, 24) and the frame (4) or the mirror base (1) in which this elastic element is arranged are manufactured in one and the same production process, such as a two-component injection molding process.

9. A hinge actuator according to claim 1, characterized in that the bearing element (9, 20) consists of one or more steel balls.

10. A hinge actuator according to claim 1, characterized in that the bearing element (9, 20) consists of one or more needle pivots.

* * * * *